US012250757B2

(12) United States Patent
Slupik

(10) Patent No.: US 12,250,757 B2
(45) Date of Patent: Mar. 11, 2025

(54) NETWORKED LIGHTING BASED ON DISTANCE BETWEEN NODES

(71) Applicant: Silvair Sp. z o.o., Cracow (PL)

(72) Inventor: Szymon Slupik, Cracow (PL)

(73) Assignee: Silvair Sp. z o.o., Cracow (PL)

( * ) Notice: Subject to any disclaimer, the term of this patent is extended or adjusted under 35 U.S.C. 154(b) by 66 days.

(21) Appl. No.: 18/099,089

(22) Filed: Jan. 19, 2023

(65) Prior Publication Data
US 2023/0262864 A1    Aug. 17, 2023

Related U.S. Application Data

(60) Provisional application No. 63/311,061, filed on Feb. 17, 2022.

(51) Int. Cl.
*H05B 47/155* (2020.01)
*H05B 47/105* (2020.01)
*H05B 47/19* (2020.01)

(52) U.S. Cl.
CPC ......... *H05B 47/155* (2020.01); *H05B 47/105* (2020.01); *H05B 47/19* (2020.01)

(58) Field of Classification Search
None
See application file for complete search history.

(56) References Cited

U.S. PATENT DOCUMENTS

| 9,220,156 | B2 | 12/2015 | Bishop et al. |
| 10,143,067 | B1 | 11/2018 | Slupik et al. |
| 2003/0102979 | A1 | 6/2003 | Jednacz et al. |
| 2012/0236554 | A1 | 9/2012 | Rust |
| 2016/0007429 | A1 | 1/2016 | Eskonen et al. |
| 2016/0091217 | A1 | 3/2016 | Verberkt et al. |

(Continued)

FOREIGN PATENT DOCUMENTS

WO    2014100832 A2    6/2014

OTHER PUBLICATIONS

Related U.S. Appl. No. 15/884,315, Office action filed Jul. 27, 2018.

(Continued)

*Primary Examiner* — Carlos Amaya
*Assistant Examiner* — Aqeel H Bukhari
(74) *Attorney, Agent, or Firm* — McGeary Cukor LLC; Kenneth Ottesen; Jason Paul DeMont

(57) ABSTRACT

A system of luminaires, which are connected to one another within a mesh network, and which interoperate in accordance with the disclosed method. A receiving luminaire receives a notification message from a second luminaire. The second luminaire can be the luminaire that originates a notification message as a result of sensing occupancy in its vicinity, or the luminaire can be an intermediary node that is relaying the notification message from another luminaire. The notification message comprises a first source address and a first light level. The receiving luminaire modifies a first light output of its lamp, wherein the first light output is based on: (i) the first light level, (ii) a distance between (a) the receiving luminaire and (b) a node corresponding to the first source address, and (iii) whether or not the first source address is a member of a first set of neighbor addresses.

22 Claims, 9 Drawing Sheets

(56) References Cited

U.S. PATENT DOCUMENTS

2017/0293273 A1\* 10/2017 Slupik .................... G05B 15/02
2017/0311423 A1\* 10/2017 Clark ..................... H05B 47/16

OTHER PUBLICATIONS

Related U.S. Appl. No. 15/884,315, Notice of Allowance filed Oct. 11, 2018.
International Search Report, PCT/US2019/014259, date of mailing Mar. 18, 2019.
International Preliminary Report on Patentability, PCT/US2019/014259, date of mailing Apr. 2, 2020.

\* cited by examiner

NETWORKED LIGHTING BASED ON DISTANCE BETWEEN NODES

CROSS-REFERENCES TO OTHER APPLICATIONS

This application claims the benefit of U.S. Provisional Patent Application Ser. No. 63/311,061, which is incorporated by reference herein.

This application is related to: (i) U.S. Pat. No. 10,143,067, which is incorporated by reference herein.

FIELD OF THE INVENTION

The present invention relates to building automation and control in general, and, more particularly, to a data-networked lighting system.

BACKGROUND OF THE INVENTION

"Commercial building automation," or "commercial automation," refers to the use of computer and information technology to control commercial building systems, such as lighting, HVAC ("heating, ventilation, and air conditioning"), audio-visual, smoke detection, security, and shading, among other systems. Using specialized hardware and control logic, building devices can monitor their environment and can be controlled automatically. Although commercial automation has been available at some level of sophistication for some time, it steadily becomes more practical, from both a technological and cost perspective.

A sophisticated commercial automation and control system might include sensors (e.g., of temperature, of light, of motion or occupancy, etc.), controllers (e.g., a general-purpose personal computer, a dedicated automation controller, etc.), and actuators or actors (e.g., motorized valves, switches, etc.). The system might also include a human-machine interface device that enables an occupant of the building to interact with the system. The interface can be a specialized terminal or an application ("app") running on a smartphone or tablet computer. The various system devices communicate over dedicated wiring, or over a wired network, or wirelessly, using one or more protocols.

Lighting automation and control systems now exist in which luminaires that comprise sensors, lamps, and control logic are networked together as "smart nodes," in what is sometimes referred to as a "connected lighting system" or a "networked lighting control system." In such a network, sensors, which can be standalone or integrated into the luminaire nodes, collect data about the local environment. For example, the sensors collect data related to occupancy in the vicinity of the luminaires. The networked luminaires communicate with one another, in some cases sharing the sensor data by publishing packet-based messages, and adjust the light output of the lamps via the control logic, with some level of coordination across the networked luminaires.

FIG. 1 depicts connected lighting network 100 in the prior art. Network 100 is an example of a wireless networked lighting control system and comprises smart nodes 101-1 through 101-M, wherein M is a positive integer (e.g., M being equal to 10 as depicted, etc.). As depicted in FIG. 1, the nodes are luminaires (denoted by "L"). Additionally, each of the luminaires comprises an occupancy sensor unit. The networked nodes communicate wirelessly with one another via transmitted signals 102-1 through 102-M. In some cases, the usable signal that is transmitted by a first node can reach a distance that is multiple nodes away from the first node. For example, signal 102-3 transmitted by node 101-3 can reach, and is usable by, node 101-7. The group of nodes can be situated within a building or other structure.

Network 100 is a mesh data network that enables communication among smart nodes 101-1 through 101-M. To this end, the nodes within network 100 distribute data (e.g., in the packet-based messages, etc.) in accordance with Bluetooth mesh networking. A "mesh network" is a network topology in which each node relays data for the network. The nodes that are involved cooperate in the distribution of data in the network.

Being a mesh network, network 100 is an example of a distributed control system. Distributed control systems have some advantages over centralized control systems, including in some cases the elimination of a single point of failure and the reduction of processor load. Furthermore, technologies such as Bluetooth mesh networking can enable a single, published message to be processed by more than one network node. For example, each luminaire node receiving a published sensor-data message can both (i) perform a predetermined lighting function, such as light output control, based on the message and (ii) decide whether to relay the message onward, thereby causing the message to "hop." In this way, a sensor-data message can, in theory, hop multiple times across a network of multiple luminaires and propagate a corresponding light effect across the network of luminaires.

For example, an illuminated area, or "light bubble," can ideally be created that is more-or-less centered on where occupancy is currently detected and in which the light output level of each luminaire included in the light bubble varies from one luminaire to another. FIG. 2 depicts such an ideal configuration, in which a light bubble coinciding with area 201-A is centered on luminaire 101-4 where occupancy is first detected, such as when a person starts walking down a hallway. Then, as the person moves toward the vicinity of luminaire 101-5, the luminaire detects occupancy by the person, thereby causing the light bubble to move and to coincide with area 201-B. Finally, as the person moves toward the vicinity of luminaire 101-6, the luminaire detects occupancy by the person, thereby causing the light bubble to move and to coincide with area 201-C. Ideally, the light bubble should follow the moving person, by providing light based on where the person currently is. This is typically achievable where a sensor-data message can be relied upon to hop from one luminaire to the next.

In reality, however, the hop-oriented approach has its limitations, as explained here. In some occupancy-based lighting scenarios, the luminaires that are to be included in a light bubble, as well as relatively distant luminaires outside of the light bubble, are all situated within a direct, or "zero-hop," range of one another. This occurs when the usable signal transmitted by a given luminaire is able to propagate across multiple luminaires, without the need for the transmitted message to be relayed through, or to "hop" between, intermediary luminaires. For example, luminaire 101-7 in FIG. 2 can be receiving, in reality, a usable signal directly from luminaire 101-4 when, according to design, a light bubble at area 201-A is to be formed that is to exclude light from luminaire 101-7.

Compounding this problem is that in Bluetooth mesh networking only the source address of the node detecting the occupancy is what is published, and not additionally the network address of any node that the message hops through. Consequently, a relatively small light bubble, such as one having a diameter of 5 meters, cannot be formed and maintained in a lighting network configuration in which a typical Bluetooth mesh transmitting range is 30-50 meters. Referring to FIG. 2, for example, given luminaires 101-3, 101-4, 101-5, 101-6, and 101-7, arranged as depicted relative to one another, mesh-node message publishing does not allow a way to configure luminaire 101-7 to act upon—or not act upon—a message that is (i) originated by luminaire 101-3, but only (ii) when relayed via one or more intermediary nodes, namely luminaires 101-4, 101-5, and 101-6.

Although a multi-hop-based approach can work well in lower-density, larger-scale configurations, such as in outdoor settings, the same approach indoors is often unworkable for at least the reasons described above.

SUMMARY OF THE INVENTION

The present invention enables a system of luminaires, which are connected to one another within a mesh network, to interoperate with one another without at least some of the disadvantages in the prior art. In particular, the inventors determined that a light-output characteristic at a given receiving luminaire, within a mesh network of luminaires, can be based on the spatial distance (e.g., straight-line distance, etc.) between (i) the originating luminaire and (ii) the receiving luminaire. The originating luminaire is the luminaire that originates a notification message as a result of sensing occupancy in its vicinity. The receiving luminaire is a luminaire, or one or more luminaires, processing the received notification message. The inventors realized that basing the light-output characteristic on at least the aforementioned spatial distance mitigates the effect of a luminaire receiving a notification message directly from an originating luminaire that is many hops away, instead of receiving the notification message through intermediary luminaires in a multi-hop fashion.

In accordance with an illustrative embodiment of the present invention, a receiving luminaire receives wirelessly a first notification message from a second luminaire. The second luminaire can be the luminaire that originates a notification message on having sensed occupancy in its vicinity, or the luminaire can be an intermediary node that is relaying the notification message from another luminaire. The first notification message comprises a first source address and a first light level. The receiving luminaire modifies a first light output of its lamp, wherein the first light output is based on: (i) the first light level, (ii) a distance between (a) the receiving luminaire and (b) a node corresponding to the first source address, and (iii) whether or not the first source address is a member of a first non-empty set of neighbor addresses. The receiving luminaire calculates the distance by identifying the originating luminaire from the received source address and looking up the distance to that originating luminaire. The receiving luminaire provides light, with its lamp, at the first light output, which is a function of the looked-up distance.

By basing the light-output characteristic (e.g., lightness, lux level) on spatial distance to the originating luminaire, a receiving luminaire is better able to control its light output. For example, if the spatial distance to the originating luminaire exceeds a predetermined threshold, the receiving luminaire can ignore the receiving notification message as having originated from a luminaire that is too far away to be triggering the creation of a light bubble in the vicinity of the receiving luminaire.

An illustrative system comprising a data network of luminaires includes a first luminaire that comprises: a first receiver configured to receive wirelessly a first message from a second luminaire, wherein the first message comprises a first source address and a first light level; a first lamp configured to provide light at a first light output; and a first processor configured to modify the first light output based on: (i) the first light level, (ii) a distance between (a) the first luminaire and (b) a node corresponding to the first source address, and (iii) whether or not the first source address is a member of a first non-empty set of neighbor addresses.

An illustrative method for controlling a plurality of luminaires in a data network that comprises a first luminaire and a second luminaire, comprises: receiving wirelessly, by the first luminaire, a first message from the second luminaire, wherein the first message comprises a first source address and a first light level; modifying, by the first luminaire, a first light output of a first lamp, wherein the first light output is based on: (i) the first light level, (ii) a distance between (a) the first luminaire and (b) a node corresponding to the first source address, and (iii) whether or not the first source address is a member of a first non-empty set of neighbor addresses; and providing light, by the first lamp, at the first light output.

An illustrative non-transitory tangible computer-readable medium storing computer-executable code, comprises code for causing a first luminaire in a data network to: receive wirelessly a first message from a second luminaire in the data network, wherein the first message comprises a first source address and a first light level; modify a first light output of a first lamp, wherein the first light output is based on: (i) the first light level, (ii) a distance between (a) the first luminaire and (b) a node corresponding to the first source address, and (iii) whether or not the first source address is a member of a first non-empty set of neighbor addresses; and provide light, by the first lamp, at the first light output.

DETAILED DESCRIPTION

Figure 1:
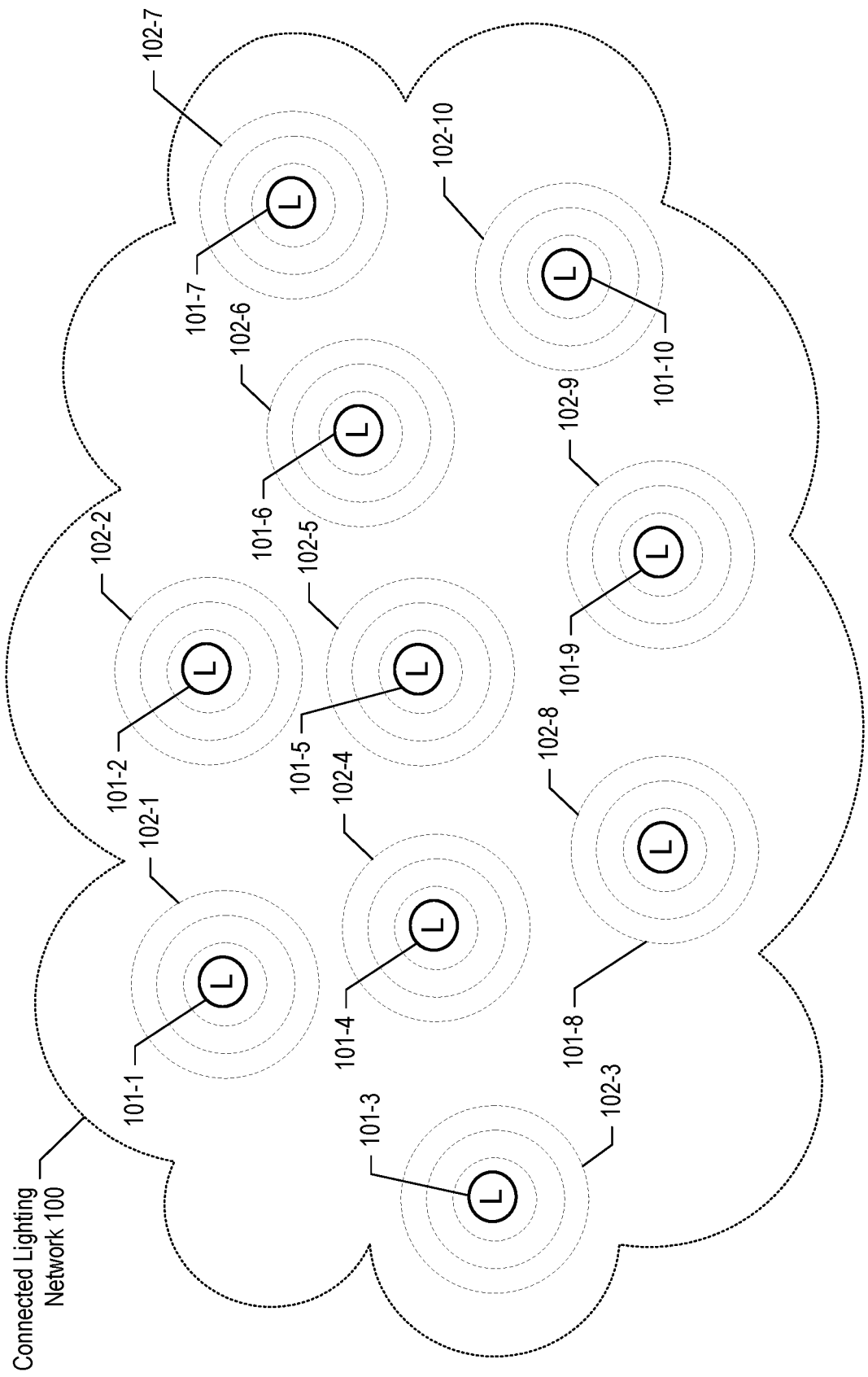
FIG. 1 depicts connected lighting network 100 in the prior art.
Figure 2:
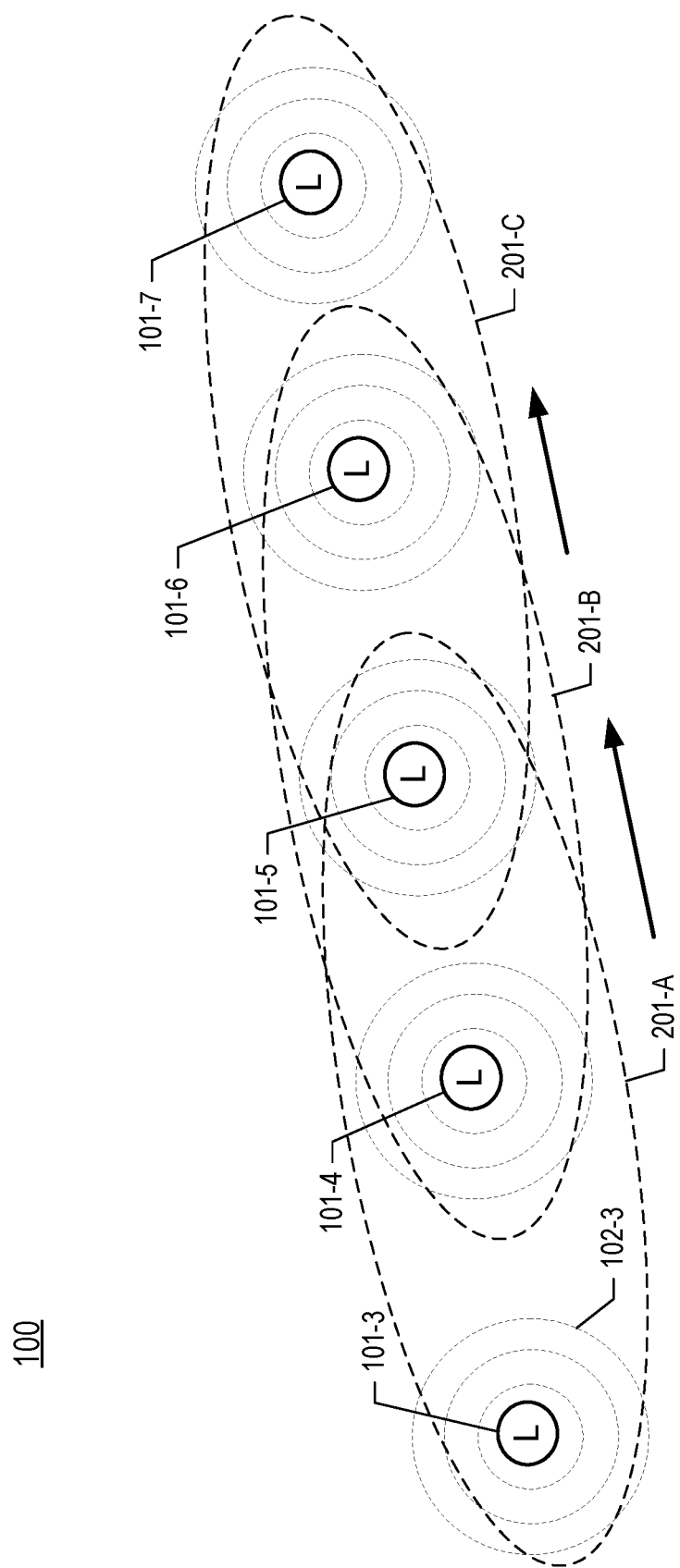
FIG. 2 in the prior art depicts a light bubble successively illuminating areas 201-A, 201-B, and 201-C.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Distance—For the purposes of this specification, the term "distance" is defined as a measurement (e.g., physical length, etc.) of how far apart objects are from one another.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire" is defined as a node in a data network comprising a lamp and a controller for controlling the lamp.

Sensor Node—For the purposes of this specification, the term "sensor node" is defined as a node in a data network comprising a sensor unit that is configured to monitor a physical condition and to report sensor data values of the physical condition.

Network address—For the purposes of this specification, the term "network address," or "computer network address," is defined as a numerical label assigned to each device (e.g., sensor node, controller or actor node, configuring node, etc) participating in a computer network. For example, an Internet Protocol address (IP address) is a numerical label assigned to each device participating in a computer network that uses the Internet Protocol for communication. A "source address" is an example of a network address, in that it specifies the device that originated a transmitted data packet or message conveyed by one or more packets.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are known in the art are depicted in block diagram form in the accompanying figures in order to keep salient aspects of the present invention from being unnecessarily obscured.

Figure 3:
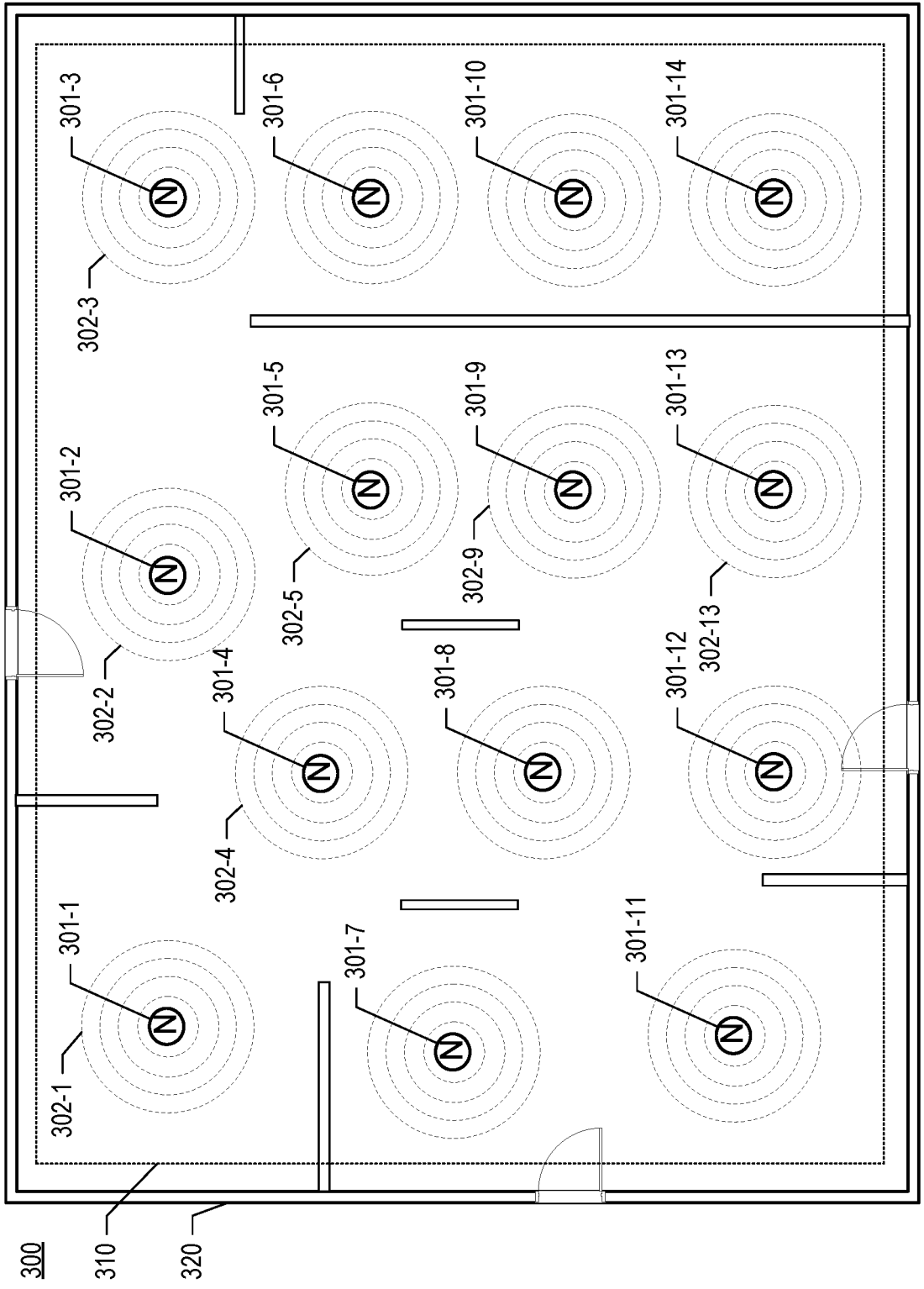
FIG. 3 depicts networked lighting control system 300 and mesh network 310 in accordance with the illustrative embodiment.

FIG. 3 depicts networked lighting control system 300 in accordance with the illustrative embodiment, which comprises network nodes 301-1 through 301-M (labeled with an "N" for "node"), wherein M is a positive integer (e.g., M equal to 14 as depicted, etc.) situated within building 320. Network nodes 301-1 through 301-M make up data network 310; as mesh nodes, they are provisioned devices that are, as a result, capable of operating within a mesh network.

Control system 300 is an example of a system having distributed logic. More particularly, in control system 300 of the illustrative embodiment, control functionality is distributed among the network nodes. Being equally privileged with one another, network nodes 301-1 through 301-M are peer devices to one another. With nodes 301-1 through 301-M operating as "smart nodes," control system 300 provides "connected lighting" or networked "smart lighting."

Data network 310 is a mesh network, as is known in the art, and enables communication among network nodes 301-1 through 301-M. To this end, the nodes within network 310 distribute data (e.g., the packet-based messages, etc.) among one another in accordance with mesh networking. A "mesh network" is a network topology in which each node relays data for the network. The nodes that are involved cooperate in the distribution of data in the network. A mesh network can relay messages—for example, by using a flooding technique and/or a routing technique.

In accordance with the illustrative embodiment, mesh network 310 uses Bluetooth as the underlying radio technology to communicate among devices. As those who are skilled in the art will appreciate after reading this specification, network 310 can use a different radio technology than Bluetooth. The requirements to enable an interoperable mesh networking for Bluetooth wireless technology are defined in the Bluetooth Mesh Networking specifications, including the "Mesh Profile Specification," Revision v1.0.1, Jan. 21, 2019, which is incorporated by reference herein. Additional information is defined in the "Bluetooth Core Specification," Revision v4.0, which is incorporated by reference herein.

The Bluetooth wireless communication standard is typically employed for exchanging communications between fixed or mobile Bluetooth-enabled devices over short distances. In some configurations, the systems and methods disclosed herein may be applied to Bluetooth Low Energy (or "Bluetooth LE" or "BLE") devices. The BLE extension of the Bluetooth standard is focused on energy-constrained applications such as battery-operated devices, sensor applications, and so on.

This description uses terminology associated with the Bluetooth and Bluetooth LE standards. As those who are skilled in the art will appreciate after reading this specification, however, the concepts can be applied to other technologies and standards that involve modulating and transmitting digital data. Such technologies and standards include, but are not limited to, Z-Wave, ZigBee, Thread, Wi-Fi, classic Bluetooth, and so on. Accordingly, while some of this description is provided in terms of Bluetooth standards, the systems and methods disclosed herein can be implemented more generally in wireless communication devices that might not conform to Bluetooth standards.

Each mesh network node 301-m (or "mesh node"), wherein m has a value between 1 and M, inclusive, is an apparatus that comprises memory, processing components, and communication components. In addition to communicating with other nodes, each mesh node is capable of performing one or more functions, as described below. Node 301-m is described in detail below and in FIG. 4, and at least some of the operations performed by the node are described below and in FIGS. 6 through 8.

Mesh node 301-m can be, or be based on, a wireless terminal or device, a wireless transmit/receive unit (WTRU), a user equipment (UE), a mobile station, wireless handset, a fixed or mobile subscriber unit, a cellular telephone or cellphone, a smartphone, a pager, a personal digital assistant (PDA), an Internet of Things (IoT) device, an application-specific device, an access terminal, a computer, a laptop computer, a desktop computer, a tablet computer, and so on, for example and without limitation.

From a data network perspective, the nodes within data network 310 are depicted according to how they are situated within building 320, according to a floor plan. As depicted in FIG. 3, nodes 301-1 through 301-M ("nodes 301") are luminaires. Each luminaire comprises a controller unit and an actor unit—in the illustrative embodiment, a luminaire with controller logic and comprising a controllable lamp as an actor unit. The networked nodes communicate wirelessly with one another via transmitted signals 302-1, 302-2, and so forth, via network 310.

At least some of nodes 301 are also sensor nodes, in addition to being luminaire nodes, in that some of the nodes further comprise a sensor unit that is configured to monitor a physical condition and to report sensor data values of the physical condition. In accordance with the illustrative embodiment, the physical condition being monitored by the sensor nodes is occupancy.

Node 301-$m$ is configured to transmit signals 302-$m$ that convey control-related information, such as packet-based messages containing output control indications. Additionally, node 301-$m$ is configured to provide light at an output that is based, at least in part, on the content of one or more data packet messages received from one or more other luminaires (e.g., output control data messages, etc.). In some alternative embodiments, node 301-$m$ can be configured to affect a physical quantity different than light output (e.g., light color, sound level, etc.), and at an output that is based, at least in part, on the content of one or more data packet messages received from one or more of the other mesh nodes 301-$m$ (e.g., output control data messages, etc.). A list of physical quantities that can be affected is provided below and with regard to the description of actor unit 402 in FIG. 4.

In accordance with the illustrative embodiment, nodes 301 constitute an automation and control system—more specifically, a networked lighting system—in a commercial building, such as an office space or a retail space. As those who are skilled in the art will appreciate after reading this specification, however, the nodes can also be applied to a different type of building, such as a home, or to include the environment surrounding the building, or to any environment in which automated control can be applied.

Furthermore, building 320 can be a different type of structure with a roof and walls, or can instead be a defined area that comprises multiple sub-areas (e.g., open space, cubicles, one or more conference rooms, one or more corridors, one or more closed offices, etc.). At least a portion of the area and/or sub-areas can be defined by something other than a roof and/or walls (e.g., a tent, an outdoor pavilion, a covered parking lot, a stadium or arena, etc.).

As depicted, at least some of nodes 301 are positioned uniformly in a grid-like pattern or in a linear pattern. However, as those who are skilled in the art will appreciate after reading this specification, the luminaires can be positioned in any geometry or geometries with respect to one another, provided that each luminaire is within communication range of one or more of the other luminaires.

Figure 4:
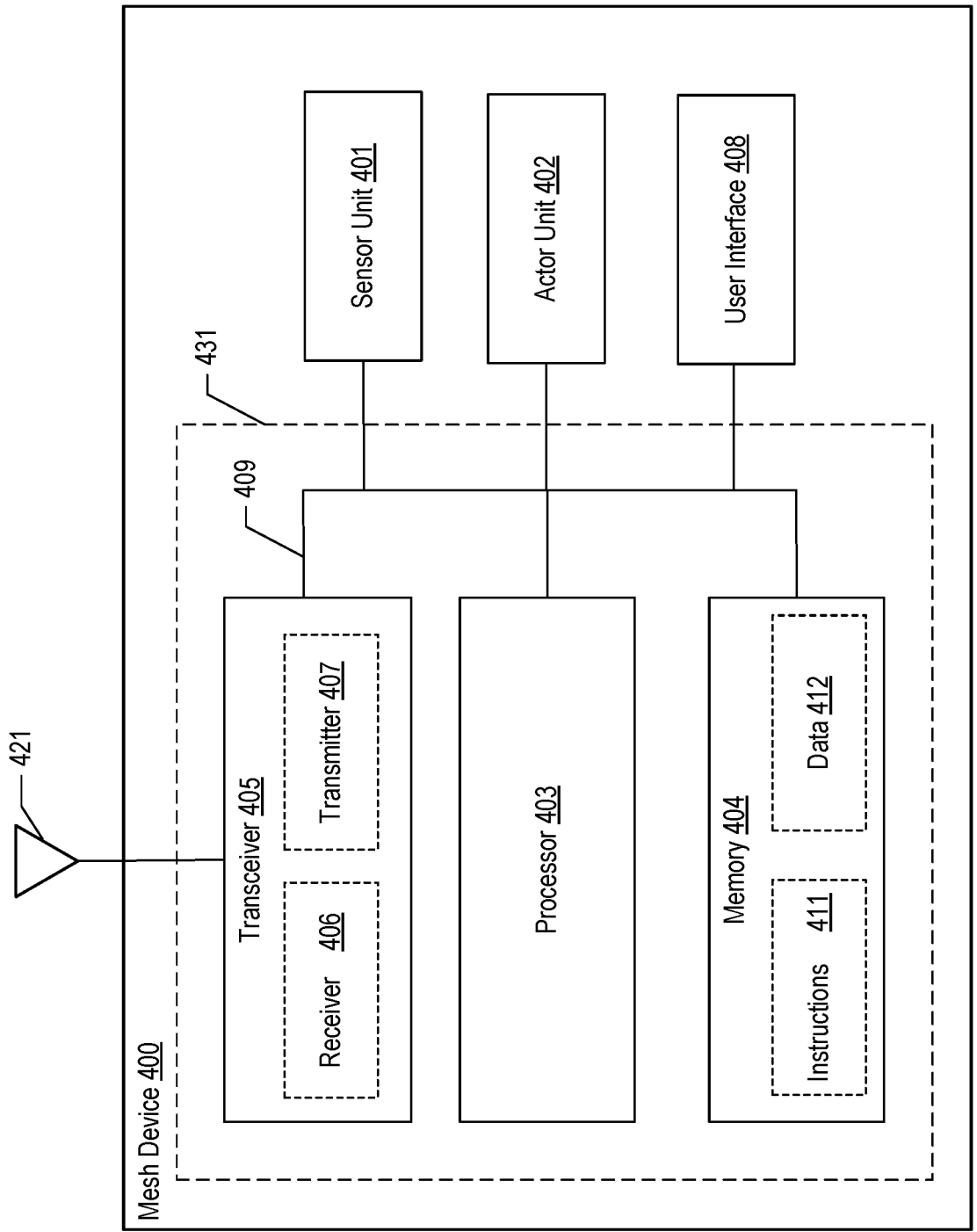
FIG. 4 depicts the salient components of mesh device 400 according to the illustrative embodiment.

FIG. 4 depicts the salient components of mesh device 400 according to the illustrative embodiment. Device 400 is based on a data-processing apparatus whose hardware platform comprises at least some of: sensor unit 401, actor unit 402, processor 403, memory 404, transceiver 405, and user interface 408, interconnected as shown. Mesh device 400 is a device (e.g., a Bluetooth device, etc.) that is capable of being provisioned and thus becoming a mesh node and a member of mesh network 310. For example, the mesh device 400 can be provisioned as any of nodes 301-1 through 301-M of FIG. 3.

Various nodes within mesh network 310 can comprise different combinations of sensors, actors, processors, memory, and transceivers. For example, some nodes within mesh network 310 can comprise a controllable lamp (i.e., an actor unit), a processor, a transceiver, and, optionally, a sensor unit (e.g., for sensing occupancy, for sensing ambient light, etc.), although some such nodes might not comprise a sensor unit. As those who are skilled in the art will appreciate after reading this specification, different configurations of mesh nodes are possible, wherein each node is based on one or more of the components that are described below.

Sensor unit 401 is an apparatus that comprises memory, processing components, and communication components, and is configured to gather information about the environment that is accessible by the sensor unit. Mesh device 400 can have one or more sensor units 401, wherein each sensor is configured to monitor a particular physical quantity (e.g., temperature, illuminance of ambient lighting, humidity, motion, occupancy, etc.). For example, a first sensor unit 401 can sense occupancy measured in terms of whether someone is present or not, and might be included in some, but not necessarily all, of the nodes within mesh network 310.

Each sensor unit is configured to report a state of the physical quantity by providing input signals to processor 403, wherein the values of the input signals are representative of the states being reported. A given sensor unit 401 can report discrete input signal values and/or a continuum of states and can report states at particular times and/or continuously. A change in state, which is determined by processor 403 as described below, can occur based one or more sensor units detecting changes in the following, in any combination:

i. environmental probes (e.g., temperature, ambient light, occupancy or motion, infrared signature, humidity, air quality, sound level, etc.).
  ii. electrical inputs (i.e., binary, analog, bus), including from a switch.
  iii. signals received via radio (e.g., proximity beacons, etc.).
  iv. a state of the internal logic, woken up periodically based on time or on an external event.

For example and without limitation, a state change can correspond to a switch being actuated, occupancy being detected, a timer or counter reaching a predefined value, and so on.

Actor unit 402 is an apparatus that comprises memory, processing components, and communication components, and is capable of doing something in the course of being affected by signals originating externally to the actor component, such as from processor 403, as described in detail below. Mesh device 400 can have one or more actor units 402, wherein each actor unit acts upon its environment. In accordance with the illustrative embodiment, a first actor unit 402 is a lamp.

Actor unit 402 is configured to receive, transmit, process, and/or relay signals conveying data, as well as being configured to affect a quantity, physical or otherwise, in its environment. Actor unit 402 provides or performs a predetermined function, such as a lamp giving off light according to a configurable light output and controlled by a control signal generated by processor 403. For example and without limitation, the quantity or condition being affected can be:
  i. lighting, which can be adjusted (e.g., turning on or off, changing light output, changing brightness, changing color or mood, changing illuminance, displaying a picture or pattern, etc.).
  ii. sound, which can be adjusted (e.g., increasing or decreasing volume, changing playlist or mood, turning on/off, selecting signal source, etc.).
  iii. room climate, which can be controlled (e.g., increasing or decreasing temperature, humidity, air fragrance, fan speed, etc.).
  iv. an alert, which can be generated (e.g., of an email, of an SMS message, etc.).
  v. monitoring by a camera, which can be panned or tilted.
  vi. office meeting/presentation settings (e.g., selecting one or more of signal source, streaming application, multimedia to play, audio language, subtitles, chapter, play/pause/stop, rewind/fast forward, etc.).
  vii. connected/smart video monitor features (e.g., selecting application to be launched, navigating through on-screen menus, etc.).
  viii. virtual keyboard—navigation on virtual keyboard displayed by other device (e.g., video monitor, set-top box, etc.).
  ix. control of shades/window coverings/blinds.
  x. access control (e.g., unlocking/locking doors, opening/shutting doors, authorizing access to selected rooms or zones, etc.).

Furthermore, device 400 can comprise any combination of and any number of actor functions. As those who are skilled in the art will appreciate, after reading this disclosure, device 400 that comprises one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Processor 403 is a processing device such as a general-purpose single- or multi-chip microprocessor (e.g., an Advanced RISC [Reduced Instruction Set Computer] Machine [ARM]), a special purpose microprocessor (e.g., a digital signal processor [DSP]), a microcontroller, a programmable gate array, and so on. Processor 403 is capable of providing control signals for one or more purposes as described in this specification.

Processor 403 is configured such that, when operating in conjunction with the other components of device 400, processor 403 executes software in the form of instructions 411, processes data in the form of data 412, and telecommunicates according to the operations described herein, including at least some of those depicted in the flow diagrams below. Processor 403 can be referred to as a "central processing unit" (CPU). Although just a single processor 403 is shown as part of mesh device 400 of FIG. 4, in an alternative embodiment a combination of processors (e.g., an ARM and DSP) can be used.

Processor 403, and memory 404 and transceiver 405 described below, constitute controller unit 431. In some embodiments of the present invention, controller unit 431 is a system on a chip (SoC) such as, but not limited to, an nRF52832 integrated circuit (IC) by Nordic Semiconductor.

Memory 404 is an electronic component capable of storing electronic information, and is in electronic communication with processor 403 (i.e., the processor can read information from and/or write information to the memory). Memory 404 can be configured as random-access memory (RAM), read-only memory (ROM), magnetic disk storage media, optical storage media, flash memory, on-board memory included with the processor, erasable programmable read-only memory (EPROM), electrically erasable programmable read-only memory (EEPROM), registers and so forth, including combinations thereof. At least some of memory 404 is non-transitory and non-volatile computer storage memory technology that is known in the art.

Memory 404 is configured to store an operating system, application software in the form of instructions 411, and a database in the form of data 412. The operating system is a collection of software that manages device 400's hardware resources and provides common services for computer programs, such as those that constitute the application software.

The application software that is executed by processor 403 according to the illustrative embodiment enables device 400 to perform the functions disclosed herein. Instructions 411 that constitutes the application software can include one or more programs, routines, sub-routines, functions, procedures, code, and so on. The instructions may include a single computer-readable statement or many computer-readable statements. Instructions 411 may be executable by processor 403 to implement the methods disclosed herein. Executing the instructions may involve the use of the data 412 that is stored in memory 404. Memory 404 stores one or more network addresses relevant to mesh device 400, including, but not limited to, the unicast address(es) of the mesh device and/or the group address(es) that the mesh device is subscribed to. When processor 403 executes instructions 411, various portions of the instructions can be loaded onto processor 403, and various pieces of data 412 can be loaded onto processor 403.

It will be clear to those having ordinary skill in the art how to make and use alternative embodiments that comprise more than one memory 404; or comprise subdivided segments of memory 404; or comprise a plurality of memory technologies that collectively store the operating system, application software, and database.

Radio transceiver 405, which is a communication interface, is configured to enable device 400 to telecommunicate with other devices and systems, including other mesh network nodes, by receiving signals therefrom and/or transmitting signals thereto via receiver 406 and transmitter 407, respectively. Transceiver 405 communicates in accordance with Bluetooth mesh networking. In some other embodiments, transceiver 405 communicates via one or more other radio telecommunications protocols other than or in addition to Bluetooth mesh networking, as described earlier.

Receiver 406 is a component that enables device 400 to telecommunicate with other components and systems by receiving signals that convey information therefrom and through antenna 421. It will be clear to those having ordinary skill in the art how to make and use alternative embodiments that comprise more than one receiver 406.

Transmitter 407 is a component that enables device 400 to telecommunicate with other components and systems by transmitting signals that convey information thereto and through antenna 421. It will be clear to those having ordinary skill in the art how to make and use alternative embodiments that comprise more than one transmitter 407.

In some embodiments of the present invention, transceiver 405 is implemented on hardware that is physically distinct from that of processor 403, while in some other embodiments transceiver 405 is implemented on the same hardware (IC) as processor 403.

As depicted, mesh device 400 has a single transceiver 405. As those who are skilled in the art will appreciate after reading this specification, mesh device 400 can have multiple transceivers. Furthermore, each transceiver 405 can have one or more receivers 406 and/or one or more transmitters 407.

In some embodiments of the present invention, mesh device 400 also comprises user interface 408. Interface 408 enables a user to interact with mesh device 400 and can comprise one or more of a touchscreen, a keyboard, a keypad, one or more switches or buttons, a pointing device, a display, and so on, for example and without limitation.

The various components of mesh device 400 can be electrically connected to one another by one or more buses, which may include a power bus, a control signal bus, a status signal bus, a data bus, and so on. For purposes of clarity, the various buses are illustrated collectively in FIG. 4 as bus system 409.

Figure 5:
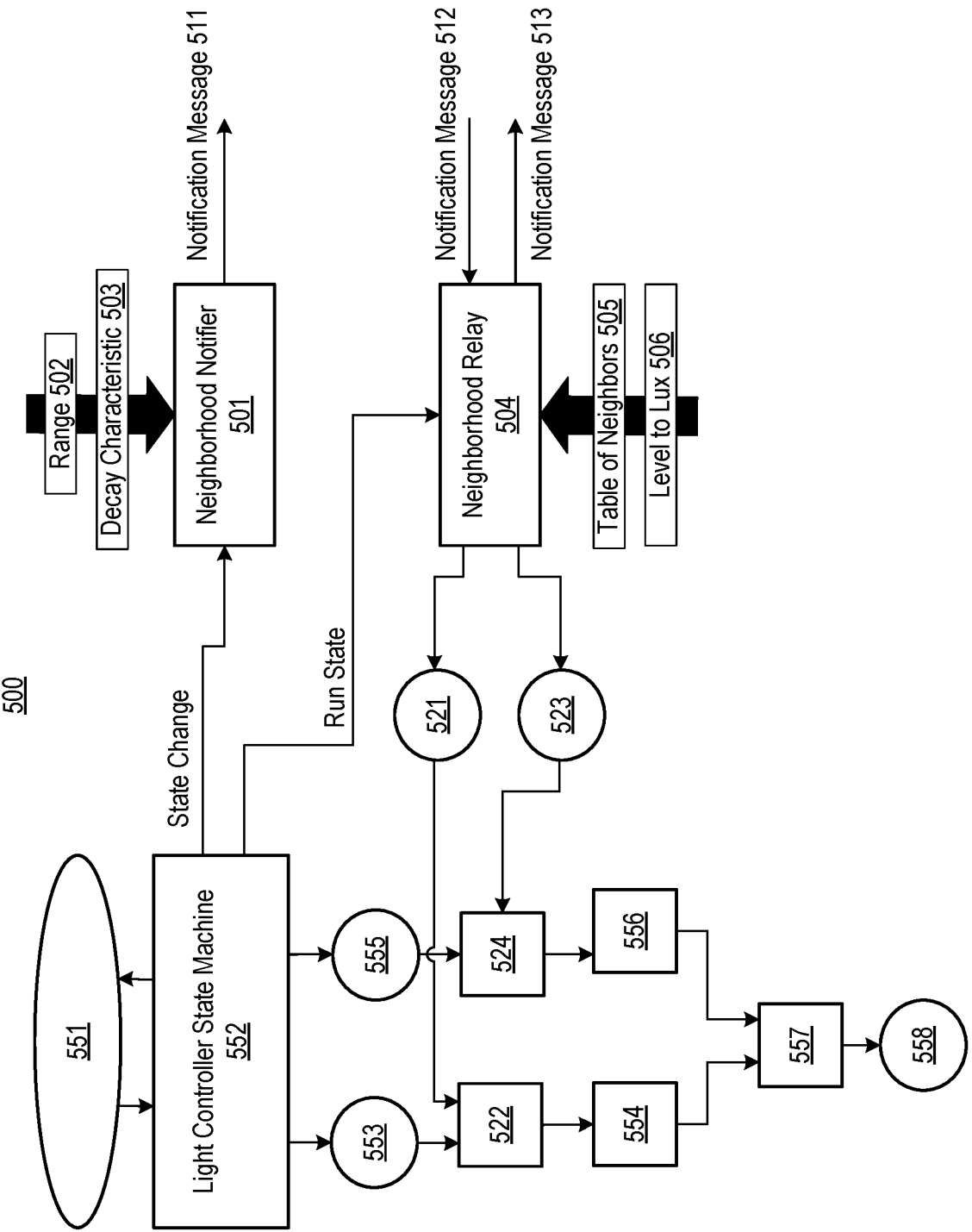
FIG. 5 depicts the salient features of Light Neighborhood Controller (NC) architecture 500, in accordance with the illustrative embodiment.

FIG. 5 depicts the salient features of Light Neighborhood Controller (NC) architecture 500, in accordance with the illustrative embodiment. Architecture 500 includes a Light Lightness Controller (LC), which is defined in Mesh Model Bluetooth® Specification, Revision v1.0.1, dated Jan. 21, 2019 (hereinafter, the "Mesh Model"), which is incorporated herein by reference.

Inputs 551 are input states to the light LC state machine 552. At least some of the inputs correlate to data (e.g., physical conditions, etc.) reported by one or more sensors. Lightness Out state 553 feeds into comparing function 522, and the result of comparing function 522 is fed into squaring function 554. The result of function 554 is fed into selection function 557, which selects the maximum of its inputs. Lux Level Out state 555 feeds comparing function 524, and the result of comparing function 524 is fed into PI (Proportional-Integral) regulator 556. The result of function 556 is fed into selection function 557. The maximum of the inputs into selection function 557 is selected as Linear Output 558, which corresponds to output of lamp of luminaire 301-$m$.

Architecture 500 also comprises functionality supportive of originating notification messages, receiving notification messages transmitted by other luminaires, and relaying information received in notification messages transmitted by other luminaires.

Architecture 500 includes property states that are read/write states that determine the configuration of a Light NC, which also comprises logic associated with Light Neighborhood Notifier 501 and Light Neighborhood Relay 504. Each state is represented by a device property. The property states include range state 502, decay characteristic state 503, table of neighbors 505, and level-to-lux state 506.

Range state 502 is a state that determines the number of logical hops (neighborhood zones) over which a published Light NC notification message is to be retransmitted.

Decay characteristic state 503 is a state that determines a characteristic, such as a coefficient and/or an exponent, in an equation that defines the decay of light levels over multiple zones.

Table of neighbors 505 is a data structure (e.g., an array, etc.) of unicast addresses of luminaire nodes that are logical neighbors.

Level-to-lux state 506 is a state that determines the light level (in lux) that lamp (actor unit) 402 of luminaire 301-$m$ provides at its maximum level. In some embodiments, this state is applicable to lighting systems having ambient light sensors (ALS), wherein the controller directs the ALS-equipped luminaire to provide an absolute lightness that is specified in lux.

Architecture 500 also depicts notification messages 511, 512, and 513. Each notification message is used to notify neighborhood luminaires about a change of state of a Light LC in the neighborhood. In some embodiments of the present invention, each notification message is unacknowledged.

For example, luminaire 301-9 can originate and transmit notification message 511 if its neighborhood controller notifier 501 detects a state change in state machine 552. These actions are described in detail below and in regard to FIG. 6.

As another example, luminaire 301-2 can receive notification message 512 that was originated or relayed by another luminaire (e.g., luminaire 301-9, luminaire 301-5, etc.). Luminaire 301-2 can then take action on the received notification message. For example, the luminaire's relay 504 logic can output an updated Lightness NC Out value 521 that can then be compared (via function 522) with pre-existing Lightness level value 553. Depending on how the two output values 553 and 521 compare with each other, one of the values (e.g., the maximum, etc.) can then be used to adjust the light output of the luminaire's lamp. Similarly, the luminaire's relay 504 logic can output an updated LuxLevel NC Out value 523 that can then be compared (via function 524) with pre-existing Lux Level Out value 555. Depending on how the two output values 555 and 523 compare with each other, one of the values (e.g., the maximum, etc.) can then be used to adjust the light output of the luminaire's lamp. These actions are described in detail below and in regard to FIG. 7.

Figure 7:
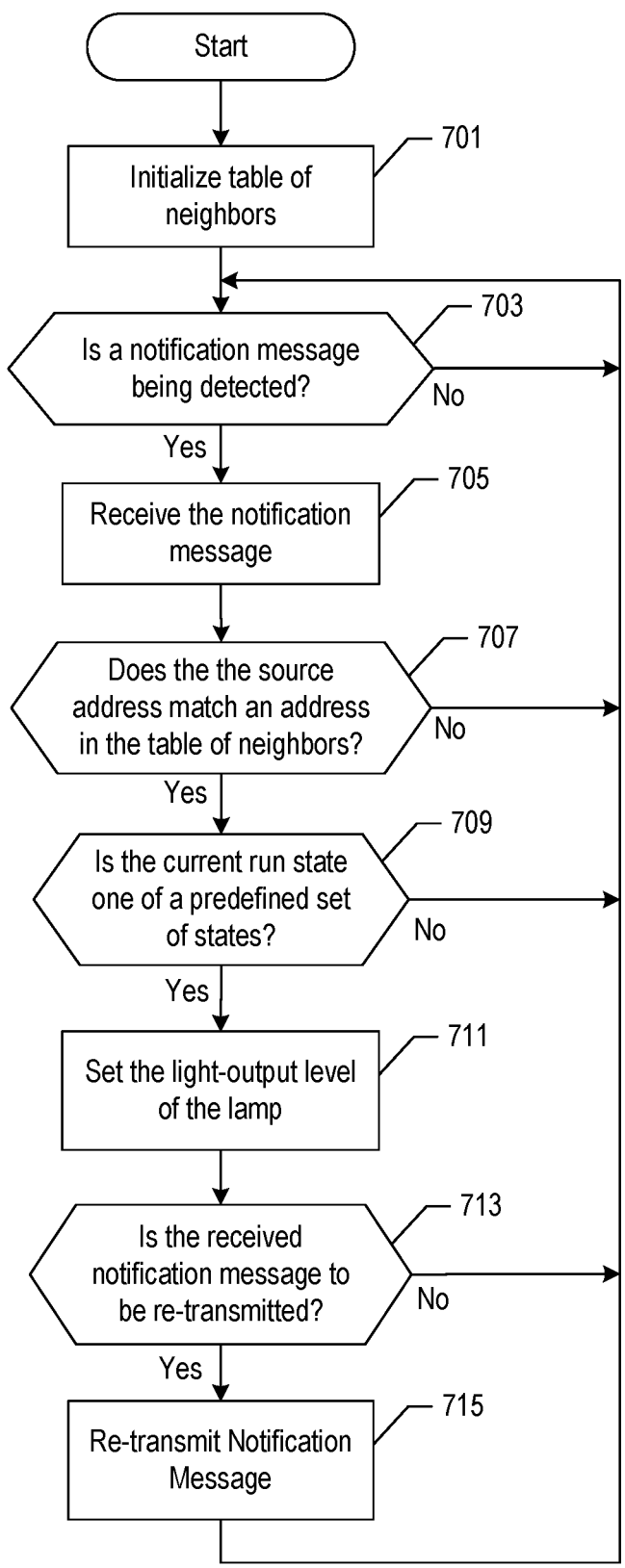
FIG. 7 depicts salient operations of method 700 according to the illustrative embodiment, by which each luminaire 301-$m$ performs various functions related to receiving one or more notification messages 512 and relaying one or more notification messages 513.

Luminaire 301-2 can also retransmit a received notification via notification message 513, which is also described in detail below and in regard to FIG. 7.

Figure 6:
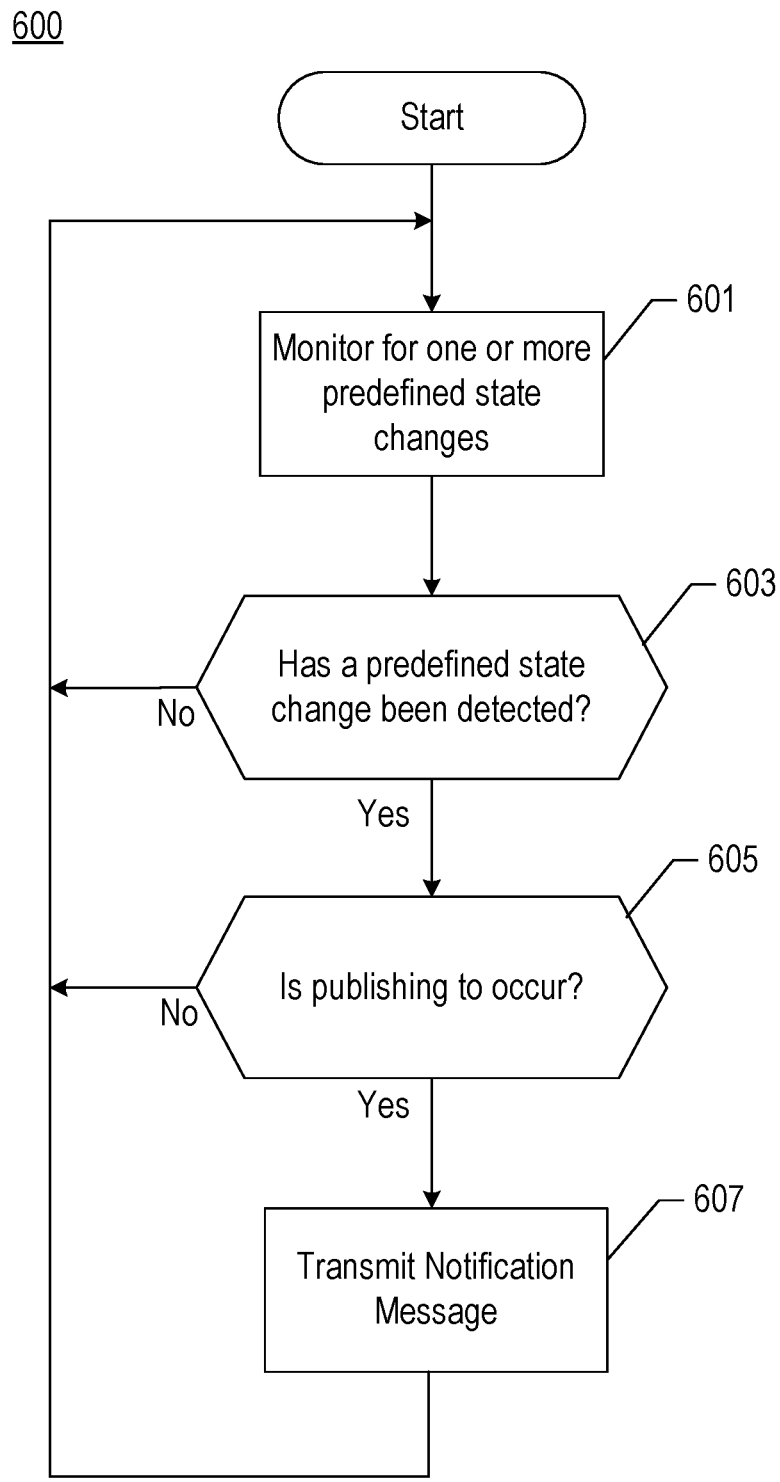
FIG. 6 depicts salient operations of method 600 according to the illustrative embodiment, by which each luminaire 301-$m$ performs various functions related to originating and transmitting one or more notification messages 511.

Operations of Luminaire 301-$m$ in Originating a Notification Message: FIG. 6 depicts salient operations of method 600 according to the illustrative embodiment, by which each luminaire 301-$m$ performs various functions related to originating and transmitting one or more notification messages 511.

In regard to method 600, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

Figure 9:
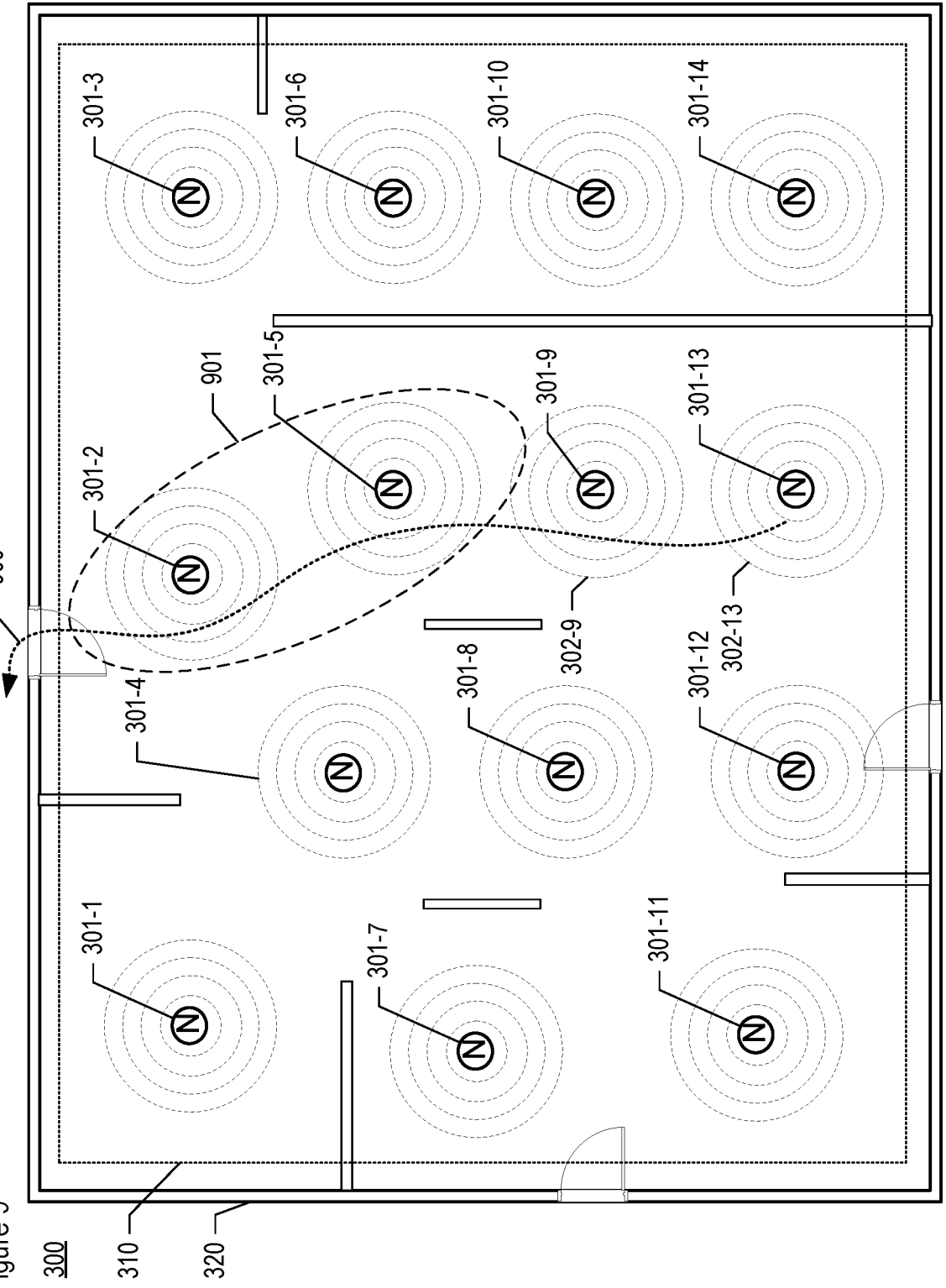
FIG. 9 depicts networked lighting control system 300 and path 900.

Luminaire 301-9 is featured here for pedagogical purposes as performing the operations associated with method 600. As those who are skilled in the art will appreciate after reading this specification, other luminaires are capable of performing method 600 concurrently with luminaire 301-9 and with one another. Luminaire 301-9 is shown within FIG. 9, which depicts networked lighting control system 300, comprising, as in FIG. 3, network nodes 301-1 through 301-M (labeled with an "N" for "node"), wherein M is a positive integer (e.g., M equal to 14 as depicted, etc.) situated within building 320. FIG. 9 further depicts path 900, traversed by a person walking through the depicted area within building 320, in the direction indicated by the arrow.

That is, path 900 is depicted as starting from an area closest to luminaire 301-13 and exiting through the door at the top of the floor plan.

Traversed path 900 passes through areas monitored for occupancy by sensor units of luminaires 301-13, 301-9, 301-5, and 301-2, in order of occupancy detection by the luminaires. These luminaires, as well as one or more of the other depicted luminaires, are capable of performing methods 600 and 700 concurrently with respect to one another. As a result, illuminated areas, or "light bubbles," are created, wherein each light bubble is more-or-less centered on where occupancy is currently detected. One such light bubble coincides with area 901 in FIG. 9 and is created in accordance with methods 600 and 700, and as a result of at least one of luminaires 301-2 and 301-5 detecting occupancy (i.e., by the person who is walking path 900) and taking action as a result (e.g., transmitting a notification message, adjusting its own light output).

In accordance with operation 601, luminaire 301-9 monitors its Light LC state machine 552 for one or more predefined changes in state. This corresponds to the "State Change" information in FIG. 5 being provided from state machine 552 to neighborhood notifier process 501. In particular, luminaire 301-9 monitors for the following state changes as defined in the Mesh Model cited above: "Change from Standby to Fade On", "Change from Run to Fade", "Change from any state to Fade Standby Auto", or "Change from any state to Fade Standby Manual".

At least some of these states changes correlate to a change in a physical condition being monitored by sensor unit 401-$j$, as described above and in regard to FIG. 4. For example, Change from Standby to Fade On can be associated with a detection of something by a sensor (e.g., occupancy, etc.), such as the presence of the person walking through the vicinity of 301-9, as represented by path 900.

In accordance with operation 603, only if a predefined state change is detected does control of task execution proceed to operation 605.

Luminaire 301-9 determines at operation 605 whether publishing is to occur. In some embodiments of the present invention, range state 502 having a value greater than zero is used to indicate that publishing is to occur.

If publishing is to occur, luminaire 301-9 at operation 607 transmits notification message 511. Message 511 comprises a plurality of fields that represent one or more of the following:
i. a source address, whose field is set to the network address of luminaire 301-9 (i.e., as the originating node). The network address of luminaire 301-9 is unique within the mesh network depicted in FIG. 9; each luminaire with the mesh network has its own unique address with the illustrative network.
ii. a propagation range, whose field is set to the value of range state 502.
iii. a hop count, whose field is set to one.
iv. a light level. If the light level is representative of a relative value of lightness (i.e., light amount), the field is set to the value of lightness out state 553. If the light level is representative of a level of lux, the field is set to the value of lux level out state 555. As those who are skilled in the art will appreciate after reading this specification, both types of light levels can be transmitted in any of the notification messages, including message 511.
v. a fade time that defines a transition time, whose field is set to the value of a predefined time interval.
vi. a value of a characteristic (e.g., coefficient, exponent, etc.) for defining the decay of light levels, and whose field is set to the value of decay characteristic state 503. As those who are skilled in the art will appreciate after reading this specification, various types of decay quantities or characteristics can be represented in this field for the purpose of defining the decay of light level linearly, exponentially, etc.

In some embodiments of the present invention, luminaire 301-9 also uses a transaction identification (TID) field in message 511, in well-known fashion. In some embodiments of the present invention, message 511 contains a subset of the above fields, in any combination.

In accordance with the illustrative embodiment, luminaire 301-9 transmits notification message 511 without including a destination address. Accordingly, it is up the other luminaires in the data network to determine whether to act on message 511, if received, based on the source address that is present in the message, and not based on any destination address.

After operation 607, control of task execution proceeds back to operation 601.

Operations of Luminaire 301-$m$ in Receiving and Relaying a Notification Message: FIG. 7 depicts salient operations of method 700 according to the illustrative embodiment, by which each luminaire 301-$m$ performs various functions related to receiving one or more notification messages 512 and relaying one or more notification messages 513.

Luminaire 301-2 is featured here for pedagogical purposes as performing the operations associated with method 700, for one or more notification messages being received from one or more luminaires. As those who are skilled in the art will appreciate after reading this specification, other luminaires are capable of performing method 700 concurrently with luminaire 301-2 and with one another. In addition, a given luminaire is capable of performing both methods 600 and 700 concurrently. Along with luminaire 301-9, luminaire 301-2 and a third illustrative luminaire 301-5 (all referred to below) are shown in FIG. 9.

In accordance with operation 701, luminaire 301-2 initializes its neighbor database, based on table of neighbors 505. In some embodiments of the present invention, the neighbor database is configured manually, while in some other embodiments the neighbor database is populated automatically—for example, by receiving table of neighbors 505 from a different node, discovering the neighbors based on radio transmissions (e.g., signal strength, time of flight, angle of arrival, etc.), and so on.

The neighbor database also includes the spatial distance of each node to luminaire 301-2 (i.e., the receiving node). The spatial distance can be straight-line (Euclidean) distance, distance traveled, geodesic distance, Manhattan distance, or Chebyshev distance, for example and without limitation. In some embodiments of the present invention, the neighbor database includes a different type of distance than spatial distance.

In some embodiments of the present invention, each distance can be manually configured, while in some other embodiments, each distance can be determined via an automated technique. A first example of an automated technique uses Bluetooth-based ranging to determine one or more of the distances. A second example of an automated technique involves using a (reflective) floor plan along with spaces in relation to the floor plan and nodes in relation to the spaces. U.S. patent application Ser. No. 15/910,338, entitled "System and Method for Commissioning Mesh Network-Capable Devices within a Building Automation and Control System," filed on Mar. 2, 2018, is incorporated by reference for the purpose of identifying spaces in relation to the floor plan and arranging the placement of nodes in relation to the spaces. In this second example, one or more of the distances can be determined from the aforementioned placement of the nodes.

In accordance with operation 703, luminaire 301-2 monitors for notification messages transmitted by other luminaires. If a notification message is detected, luminaire 301-2 at operation 705 receives and reads in notification message 512. Message 512 can be a message that was originated by a different luminaire, such as message 511 originated by luminaire 301-9, or can be a message that was relayed (retransmitted) by a different luminaire, such as message 513 relayed by luminaire 301-5, for example.

In accordance with operation 707, if the source address in message 512 matches a neighbor address in the database initialized at operation 701, control of task execution proceeds to operation 709; otherwise, control proceeds back to operation 703.

In accordance with operation 709, luminaire 301-2 monitors its Light LC state machine 552 for one or more predefined states. This corresponds to the "Run State" information in FIG. 5 being provided from state machine 552 to neighborhood relay process 504. In particular, the predetermined set of states includes the following that are defined in the Mesh Model: Standby, Fade, Prolong, Fade Standby Auto, and Fade Standby Manual. If the Light LC Controller is in one of the predefined set of states, control of task execution proceeds to operation 711; otherwise, control proceeds back to operation 703.

Figure 8:
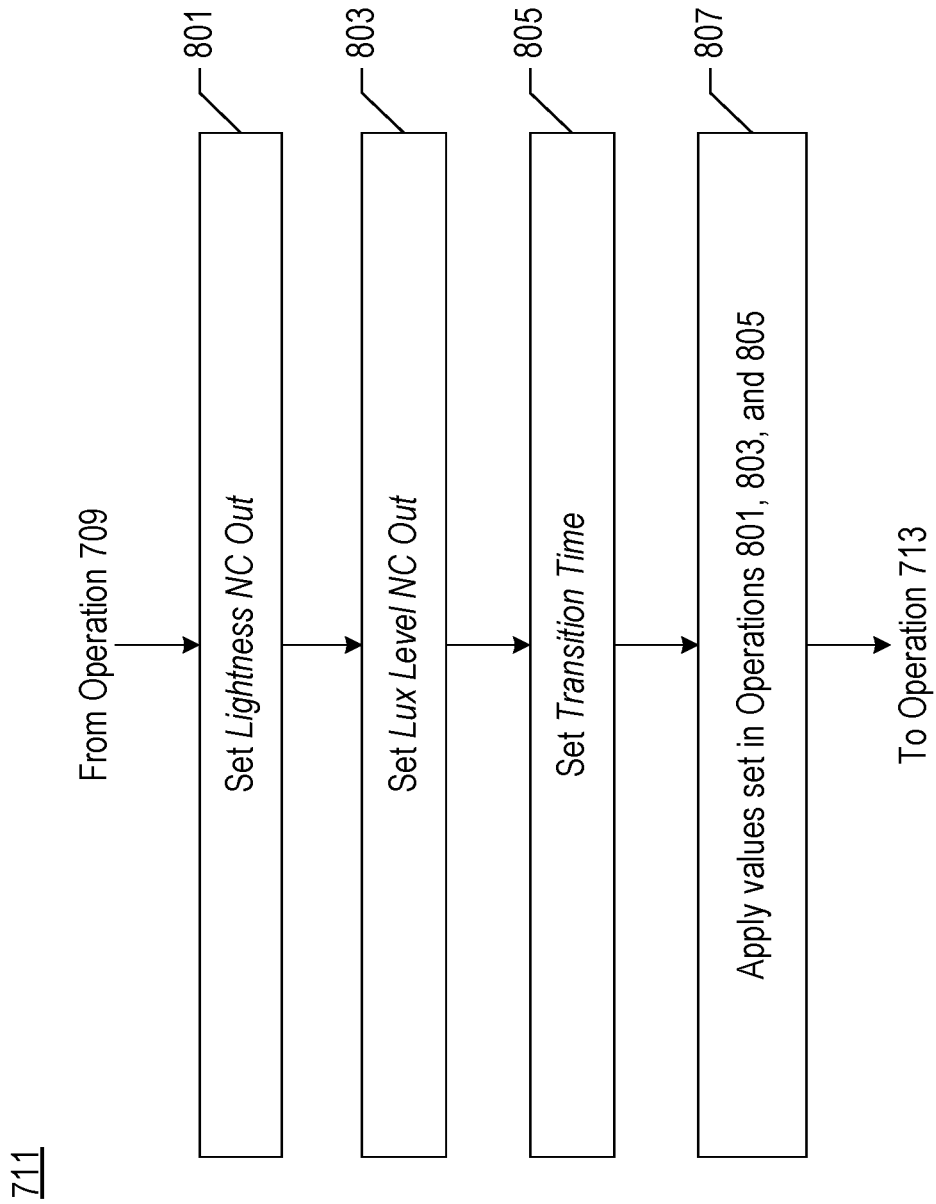
FIG. 8 depicts salient sub-operations of operation 711, by which a luminaire performs various functions related to modifying the light output of its lamp.

In accordance with operation 711, neighborhood controller relay 504 of luminaire 301-2 sets Lightness NC Out state 521, Lux Level NC Out state 523, and the transition time, as described below and in FIG. 8.

In accordance with operation 713, luminaire 301-2 determines whether information in the received notification message 512 is to be retransmitted. If the value in the hop count field is less than the propagation range field received in message 512, control of task execution proceeds to operation 715 to retransmit the received information; otherwise, control proceeds back to operation 703. In some embodiments of the present invention, luminaire 301-2 also uses a transaction identification (TID) field and TID cache in well-known fashion, in order to determine whether to proceed to operation 715 or not. In some embodiments of the present invention, determining whether information in the received notification message 512 is to be retransmitted is based on something different than hop count value, such as spatial distance.

In accordance with operation 715, luminaire 301-2 relays notification message 513. Message 513 comprises a plurality of fields that represent one or more of the following:
  i. a source address, whose field is set the source address of luminaire 301-9 (i.e., as the originating node, as opposed to luminaire 301-5 serving as a relay node).
  ii. a propagation range, whose field is set to the value of the corresponding field in received message 512.
  iii. a hop count, whose field is set to the value of the corresponding field in received message 512, incremented by one.
  iv. a light level, whose field or fields are set to the value of the corresponding fields (Lightness, LuxLevel) in received message 512.
  v. a fade time, whose field is set to the value of the corresponding field in received message 512.
  vi. a decay characteristic, whose field is set to the value of the corresponding field in received message 512.

In those embodiments of the present invention in which luminaire 301-2 uses a transaction identification (TID) field and TID cache, the luminaire also sets the TID field in message 513 and stores the value of the TID field in the TID cache. In some embodiments of the present invention, message 513 contains a subset of the above fields, in any combination.

After operation 715, control of task execution proceeds back to operation 703.

Operations of Luminaire 301-m in Controlling Its Lamp: FIG. 8 depicts salient sub-operations of operation 711, by which a luminaire performs various functions related to modifying the output of its lamp.

In accordance with operation 801, neighborhood controller relay 504 of luminaire 301-2 sets Lightness NC Out state 521, to the value that is determined using the function "$f_1(\ )$" in Equation 1:

$$\text{Lightness}NCOut = f_1(\text{Distance}, \text{Lightness}, \text{HopCt}, \text{Range}, \text{DecayChar}), \quad \text{(Eq. 1)}$$

wherein:
  Distance is the value of the spatial distance between luminaire 301-9 (i.e., the originating node) and luminaire 301-2 (i.e., the node performing operation 801), which is stored in luminaire 301-2's neighbor database in accordance with operation 701 and accessed in the database based on the value of the source address field of received notification message 512,
  Lightness is the value of the lightness field (light level field if representing lightness) of message 512,
  HopCt is the value of the hop count field of message 512,
  Range is the value of the propagation range field of message 512, and
  DecayChar is the value of the decay characteristic field of message 512.

As those who are skilled in the art will appreciate after reading this specification, function $f_1(\ )$, and function $f_2(\ )$ below, can be defined as a function or functions on any or all of the foregoing parameters, in any combination. For example and without limitation, $f_1(\ )$ and/or $f_2(\ )$ can be defined based on Distance and not HopCt. Also, the function can be linear and/or polynomial and/or exponential. In some embodiments of the present invention, the function can be based on a user interface allowing for hand-drawing the expected dependency of light on the distance of the originating event source and would effectively become the shape of the "light bubble" surrounding the source.

In some embodiments of the present invention, the value(s) of $f_1(\ )$ and/or $f_2(\ )$ can be set to zero (or some predetermined value) based, at least in part, on Distance exceeding a predetermined threshold. This can be used, for example, to create a light bubble illuminating area 901 if the originating node (i.e., sensing occupancy) is luminaire 301-2, 301-5, or 301-9, and not luminaire 301-13, because luminaire 301-13's distance is too far from the luminaire performing the operations of FIG. 8.

Consistent with the type of spatial distance that is stored in the neighbor database, spatial distance can be straight-line (Euclidean) distance, distance traveled, geodesic distance, Manhattan distance, or Chebyshev distance, for example and without limitation. In some embodiments of the present invention, $f_1(\ )$ and/or $f_2(\ )$ is based on a different type of distance than spatial distance.

In accordance with operation 803, neighborhood controller relay 504 of luminaire 301-2 sets LuxLevel NC Out state 523, to the value that is determined using Equation 2:

$$\text{LuxLevel}NC\text{Out} = f2(\text{Distance}, \text{LuxLevel}, \text{HopCt}, \text{Range}, \text{DecayChar}), \quad \text{(Eq. 2)}$$

wherein:

Distance is the value of the spatial distance between luminaire 301-9 (i.e., the originating node) and luminaire 301-2 (i.e., the node performing operation 803), which is stored in luminaire 301-2's neighbor database in accordance with operation 701 and accessed in the database based on the value of the source address field of received notification message 512, LuxLevel is the value of the luxlevel field (light level field if representing lux level) of message 512, HopCt is the value of the hop count field of message 512, Range is the value of the propagation range field of message 512, and DecayChar is the value of the decay characteristic field of message 512.

In accordance with operation 805, neighborhood controller relay 504 of luminaire 301-2 sets the transition time to the value represented by the fade time field of received notification message 512.

In accordance with operation 807, luminaire 301-2 applies the values of Lightness NC Out state 521, LuxLevel NC Out state 523, and/or the transition time, as determined in operations 801, 803, and 805, respectively. In doing so, processor 403 of luminaire 301-2 determines light output 558 and transmits control signals to its lamp 402-1 accordingly, while accounting for the transition time. The controller of luminaire 301-2 determines light output 558 based on the relationship of states 521 and 523 to light output 558 described above and with respect to FIG. 5.

In some embodiments of the present invention, when luminaire 301-2 receives notification messages from multiple luminaires, its controller tracks each individual neighbor (i.e., each luminaire that is in stored table of neighbors 505) and selects the maximum value of all tracked neighbors. For example, luminaire 301-2 is at a 10% lightness level. It receives a first notification message from neighbor luminaire 301-9 conveying a lightness value of 40%, thereby triggering luminaire 301-2 to output at 40%. It also receives a second notification message from neighbor luminaire 301-5 conveying a lightness value of 70%, thereby triggering luminaire 301-2 to output at 70% (i.e., the maximum value of 10, 40, and 70 percent). After luminaire 301-9 becomes inactive (while luminaire 301-5 remains active), luminaire 301-2 continues to output at 70%, but now only considering lightness values of 10% and 70%.

As those who are skilled in the art will appreciate after reading this specification, a different comparing function than "maximum" can be used to determine a light output (e.g., minimum, average, median, etc.).

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, flash storage, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, Blu-ray™ disc, and Ultra HD disc where disks usually reproduce data magnetically, while discs reproduce data optically with lasers.

It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), flash storage, read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising a data network of luminaires including a first luminaire, the first luminaire comprising:
    a first receiver configured to receive wirelessly a first message from a second luminaire in the data network, wherein the first message comprises a first source address and a first light level;
    a first lamp configured to provide light at a first light output; and
    a first processor configured to modify the first light output based on:
        i) the first light level,
        ii) a spatial distance between (a) the first luminaire and (b) a node corresponding to the first source address, and iii) whether or not the first source address is a member of a first non-empty set of neighbor addresses.

2. The system of claim 1 further comprising the second luminaire, the second luminaire comprising:
a sensor configured to monitor a physical condition;
a second lamp configured to provide light at a second light output;
a second processor configured to i) generate a state change that is based on a change in the physical condition and ii) modify the second light output based on the state change; and
a first transmitter configured to transmit wirelessly the first message based on the state change, and wherein the first source address is the network address of the second luminaire in the data network of luminaires.

3. The system of claim 1 further comprising the second luminaire, the second luminaire comprising:
a second receiver configured to receive wirelessly a third message from a third luminaire in the data network, wherein the third message comprises the first source address;
a second lamp configured to provide light at a second light output;
a second processor configured to modify the second light output based on a spatial distance between:
a) the second luminaire, and
b) the node corresponding to the first source address; and
a first transmitter configured to transmit wirelessly the first message comprising the first source address received in the third message.

4. The system of claim 3 wherein the first source address is the network address of the third luminaire in the data network of luminaires.

5. The system of claim 2 wherein the physical condition is occupancy.

6. The system of claim 1 wherein the first light level received in the first message is representative of a relative value of light amount.

7. The system of claim 1 wherein the first light level received in the first message is representative of a level of lux.

8. The system of claim 1 wherein the first message further comprises a fade time that characterizes a transition time from a second light level to a third light level, and wherein the first processor of the first luminaire is configured to determine the first light output further based on the fade time received in the first message.

9. The system of claim 1:
wherein the first receiver of the first luminaire is further configured to receive wirelessly a third message from a third luminaire, wherein the third message comprises a second source address; and
wherein the first processor of the first luminaire is configured to modify the first light output of the first lamp, further based on a spatial distance between:
a) the first luminaire, and
b) a node corresponding to the second source address.

10. The system of claim 1 wherein the first message further comprises a first hop count, and wherein the first luminaire further comprises a first transmitter configured to transmit wirelessly a second message, wherein a decision of whether or not to transmit the second message is based on the first hop count.

11. The system of claim 1 wherein the first luminaire is configured to communicate with other luminaires in the data network of luminaires in accordance with Bluetooth mesh networking.

12. A method for controlling a plurality of luminaires in a data network that comprises a first luminaire and a second luminaire, the method comprising:
receiving wirelessly, by the first luminaire, a first message from the second luminaire, wherein the first message comprises a first source address and a first light level;
modifying, by the first luminaire, a first light output of a first lamp, wherein the first light output is based on:
i) the first light level,
ii) a spatial distance between (a) the first luminaire and (b) a node corresponding to the first source address, and
iii) whether or not the first source address is a member of a first non-empty set of neighbor addresses; and
providing light, by the first lamp, at the first light output.

13. The method of claim 12 further comprising:
monitoring, by a sensor of the second luminaire, a physical condition;
generating, by the second luminaire, a state change that is based on a change in the physical condition;
modifying, by the second luminaire, a second light output of a second lamp, wherein the second light output is based on the state change;
transmitting wirelessly, by the second luminaire, the first message based on the state change, wherein the first source address is the network address of the second luminaire in the data network of luminaires; and
providing light, by the second lamp, at the second light output.

14. The method of claim 12 further comprising:
receiving wirelessly, by the second luminaire, a third message from a third luminaire in the data network, wherein the third message comprises the first source address;
modifying, by the second luminaire, a second light output of a second lamp, wherein the second light output is based on a spatial distance between (a) the second luminaire and (b) the node corresponding to the first source address;
transmitting wirelessly, by the second luminaire, the first message comprising the first source address received in the third message; and
providing light, by the second lamp, at the second light output.

15. The method of claim 14 wherein the first source address is the network address of the third luminaire in the data network of luminaires.

16. The method of claim 13 wherein the physical condition is occupancy.

17. The method of claim 12 wherein the first light level received in the first message is representative of a relative value of light amount.

18. The method of claim 12 wherein the first light level received in the first message is representative of a level of lux.

19. The method of claim 12 wherein the first message further comprises a fade time that characterizes a transition time from a second light level to a third light level, and wherein the first light output is further based on the fade time received in the first message.

20. The method of claim 12, further comprising:
receiving wirelessly, by the first receiver of the first luminaire, a third message from a third luminaire, wherein the third message comprises a second source address; and
modifying, by the first processor of the first luminaire, the first light output of the first lamp, further based on a spatial distance between (a) the first luminaire and (b) a node corresponding to the second source address.

21. The method of claim 12, further comprising transmitting wirelessly a second message, wherein a decision of whether or not to transmit the second message is based on a first hop count, and wherein the first message further comprises the first hop count.

22. A non-transitory tangible computer-readable medium storing computer-executable code, comprising code for causing a first luminaire in a data network to:
receive wirelessly a first message from a second luminaire in the data network, wherein the first message comprises a first source address and a first light level;
modify a first light output of a first lamp, wherein the first light output is based on:
  i) the first light level,
  ii) a spatial distance between (a) the first luminaire and (b) a node corresponding to the first source address, and
  iii) whether or not the first source address is a member of a first non-empty set of neighbor addresses; and
provide light, by the first lamp, at the first light output.

\* \* \* \* \*